(12) United States Patent
Yoon

(10) Patent No.: US 11,005,846 B2
(45) Date of Patent: May 11, 2021

(54) METHOD AND APPARATUS FOR PROVIDING TRUST-BASED MEDIA SERVICES

(71) Applicant: ELECTRONICS AND TELECOMMUNICATIONS RESEARCH INSTITUTE, Daejeon (KR)

(72) Inventor: Young Seog Yoon, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 262 days.

(21) Appl. No.: 16/213,874

(22) Filed: Dec. 7, 2018

(65) Prior Publication Data

US 2019/0182258 A1    Jun. 13, 2019

(30) Foreign Application Priority Data

Dec. 7, 2017   (KR) .................. 10-2017-0167760
Dec. 4, 2018   (KR) .................. 10-2018-0154739

(51) Int. Cl.
*H04L 29/06*     (2006.01)
*H04L 12/58*     (2006.01)
(Continued)

(52) U.S. Cl.
CPC .......... *H04L 63/102* (2013.01); *G06F 16/435* (2019.01); *G06F 16/45* (2019.01); *G06Q 50/01* (2013.01); *H04L 51/22* (2013.01)

(58) Field of Classification Search
CPC ....... H04L 51/10; H04L 51/22; H04L 63/102; H04L 63/10; H04L 51/12; H04L 2463/101; G06Q 50/01; G06F 16/45; G06F 16/435
See application file for complete search history.

(56) References Cited

U.S. PATENT DOCUMENTS 7,567,970 B2   7/2009  Chung
8,176,057 B2   5/2012  Kim et al.
(Continued)

FOREIGN PATENT DOCUMENTS

JP        6956272 B2      7/2016
KR     10-0462542 B1   12/2004
(Continued)

OTHER PUBLICATIONS

"Framework of Trust-based Media Services", Series Y: Global Information Infrastructure, Internet Protocol Aspects, Next-Generation Networks, Internet of Things and Smart Cities, May 2018, pg. 1-22, International Telecommunication Union.

*Primary Examiner* — Mohammad A Siddiqi

(57) ABSTRACT

Provided are a method and an apparatus for providing a trust-based media service. First user related data and second user related data are collected from a media service and other service, the trust is analyzed based on the collected data, trust information including the trust index of the first user or the second user is obtained, and the trust information is provided. The trust index is calculated based on a value of trustworthiness for a user obtained based on a first individual measurement index calculated based on the collected data and a value of relationship between the first user and the second user obtained based on a second individual measurement index calculated based on the collected data.

19 Claims, 12 Drawing Sheets

(51) Int. Cl.
*G06F 16/45* (2019.01)
*G06F 16/435* (2019.01)
*G06Q 50/00* (2012.01)

(56) References Cited

U.S. PATENT DOCUMENTS

| | | | | |
|---|---|---|---|---|
| 9,954,814 | B1* | 4/2018 | Schaffer | H04L 51/32 |
| 2002/0097267 | A1* | 7/2002 | Dinan | H04L 29/06 715/757 |
| 2010/0106559 | A1* | 4/2010 | Li | G06Q 30/018 705/317 |
| 2011/0179062 | A1 | 7/2011 | Lee et al. | |
| 2013/0097056 | A1 | 4/2013 | Sun et al. | |
| 2014/0215575 | A1* | 7/2014 | Hoyos | H04L 63/107 726/4 |
| 2015/0088680 | A1* | 3/2015 | Gujar | G06Q 30/0645 705/26.3 |
| 2015/0206034 | A1 | 7/2015 | Park et al. | |
| 2017/0134162 | A1 | 5/2017 | Code et al. | |
| 2017/0352044 | A1 | 12/2017 | Yoo et al. | |
| 2019/0147548 | A1* | 5/2019 | Klein | G06Q 10/1095 705/7.19 |

FOREIGN PATENT DOCUMENTS

| | | |
|---|---|---|
| KR | 10-2010-0109847 A | 10/2010 |
| KR | 10-2011-0007264 A | 1/2011 |
| KR | 10-1073602 B1 | 10/2011 |
| KR | 10-2014-0096411 A | 8/2014 |
| KR | 10-1677684 B1 | 11/2016 |

\* cited by examiner

METHOD AND APPARATUS FOR PROVIDING TRUST-BASED MEDIA SERVICES

CROSS-REFERENCE TO RELATED APPLICATION

This application claims priority to and the benefit of Korean Patent Application Nos. 10-2017-0167760 and 10-2018-0154739 filed in the Korean Intellectual Property Office on Dec. 7, 2017, and Dec. 4, 2018, respectively, the entire contents of which are incorporated herein by reference.

BACKGROUND OF THE INVENTION

(a) Field of the Invention

The present invention relates to a method for providing a media service and more particularly, to a method and an apparatus for providing trust-based media services.

(b) Description of the Related Art

Due to proliferation of various online media, massive amounts of contents are being shared and spread. Particularly, like user created contents (UCC), contents which are produced by an ordinary person rather than professional content producers are explosively increasing.

However, content sharing always has risks and uncertainties such as unintentional content leakage, terminal infection, and personal information attacks. In order to solve the problems caused during the process of sharing the contents of users, media service providers of the related art mainly use a method of providing rating (reputation) information of the contents or a method of directly investigating the content risk through the user's report.

However, the method of providing rating (reputation) information of contents has a problem in that content consumers who are capable of reproducing and redistributing the contents are not included as analysis subjects. Further, it does not mean that content with a high rating is necessarily trustworthy. From the academic point of view, the ratings or reputations are accepted as a leading factor of trust and are separate concepts. Further, key factors which affect the ratings or reputations are price, satisfaction, and quality, but the trust may be judged by an ability, benevolence, and integrity of trustees. Therefore, the trust of the trustee may not be judged only by the rating information.

Further, investigation of the content risk based on the user's report has drawbacks in that not only cost and time are incurred, but also it takes a predetermined time for an initial response after harmful content is initially produced.

In addition, these approaches are confined to content producers and thus have a clear limit in that the problems of redistribution and manipulation of the contents caused by the content consumers cannot be solved. Further, in some media services, even though reputation information of content producer are provided, since it is analyzed only using the data in the media services, it is difficult to perform the analysis from a multi-dimensional viewpoint.

As a related art document, there is Korean Patent Laid-Open Publication No. 2010-0109847 entitled "System and Method for Searching/Offering Reliable Contents".

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and an apparatus for providing a trust-based media service which prevent production and consumption of suspicious media by untrustworthy users and are robust to unexpected executions and failure with certain predictability and reliability, based on analysis of trust information of content producers and content consumers.

According to an exemplary embodiment of the present invention, a method for providing a trust-based media service is provided. The method includes: collecting first user related data and second user related data from a media service and other service; analyzing a trust based on the collected data and obtaining trust information including a trust index of the first user or the second user; and providing the trust information, wherein the trust index is calculated based on a value of trustworthiness for a user obtained based on a first individual measurement index calculated based on the collected data and a value of a relationship between the first user and the second user obtained based on a second individual measurement index calculated based on the collected data.

The first individual measurement index may be calculated based on a value indicating an ability for every user, a value indicating integrity for every user, a value indicating benevolence for every user, and a value indicating sincerity for every user and the second individual measurement index may be calculated based on a value indicating a similarity of the first user and the second user, a value indicating a relationship period of the first user and the second user, and a value indicating closeness of the first user and the second user.

The value indicating ability may be calculated based on the number of mails received in the media service and other service, the number of friends, and the number of get "likes".

The value indicating ability may be calculated based on a condition of the following equation and $$\text{Ability}(j, t) = \frac{\text{Number of received mail}_j}{\text{Number of received mail}_j + 1} + \frac{\text{Number of friends}_j}{\text{Number of frinds}_j + 1} + \frac{\text{Number of get "like"}_j}{\text{Number of get "like"}_j + 1}$$

the Ability (j, t) denotes a value indicating an ability for a user j at a timing t, the "Number of received mail$_j$" denotes the number of mails received by the user j, "Number of friends$_j$" denotes the number of friends of the user j in the social network, and "Number of get "like"$_j$" denotes the number of get "likes" by the user j in the social network.

The value indicating integrity may be calculated based on the number of times that the user is reported or blocked by another user due to a behavior which violates a rule in the media service and the other service.

The value indicating integrity may be calculated based on a condition of Integrity(j,t)=M−($n_{j,A}$+$n_{j,SNS}$), the Integrity(j, t) denotes a value indicating integrity for the user j at the timing t, M denotes an initial value, the $n_{j,A}$ denotes the number of times that the user j is reported and blocked by another user in the media service, and the $n_{j,SNS}$ denotes the number of times that the user j is reported and blocked by another user in the other service.

The value indicating sincerity may be calculated based on a standard deviation of a content which is produced by the user in the media service and the other service.

The value indicating sincerity may be calculated based on a condition of $$\text{Sincerity}(j, t) = \frac{1}{STD^{j,A}} + \frac{1}{STD^{j,SNS}},$$

the Sincerity(j,t) may denote the sincerity corresponding to consistency for an activity of the user j in the service, the $STD^{j,A}$ may denote a standard deviation of contents which are produced by the user j in the media service until the period t, and the $STD^{j,SNS}$ may denote a standard deviation of contents which are produced by the user j in the other service until the period t.

The value indicating similarity of the first user and the second user may be calculated based on the number of contents which are sent from the first user to another user, the number of contents which are received from another user, the number of contents which are sent from the second user to another user, and the number of contents which are received from another user.

The value indicating similarity of the first user and the second user may be calculated based on a condition of $$\text{Similarity}(j, i, t) = \left(\frac{\text{sent content}(i) \cap \text{sent content}(j)}{\text{sent content}(i) \cup \text{sent content}(j)}\right) +$$
$$\left(\frac{\text{received content}(i) \cap \text{received content}(j)}{\text{received content}(i) \cup \text{received content}(j)}\right) +$$
$$\left(\frac{\text{friends}(i) \cap \text{friends}(j)}{\text{friends}(i) \cup \text{friend}(j)}\right),$$

the Similarity (j, i, t) may denote a value indicating similarity of the second user for the first user i at the timing t, the Sent content(i) may denote the number of contents which are sent by the first user i to another user until the period t, the Sent content(j) may denote the number of contents which are sent by the second user j to another user until the period t, the received content(i) may denote the number of contents which are received by the first user i from another user until the period t, the received content(j) may denote the number of contents which are received by the second user j from another user until the period t, the Friend (i) may denote a list of friends of the first user i in the other service, and the Friend (j) may denote a list of friends of the second user j in the other service.

The value indicating a relationship period of the first user and the second user may be calculated based on a date when the first user starts using the service, a date when the second user starts using the service, a date when the first user and the second user become friends, and a first date when the second user sends the content to the first user.

The value indicating the relationship period of the first user and the second user may be calculated based on a condition of $$\text{Relationship period}(j, i, t) =$$
$$\left(\frac{\text{first content}(j, i)}{\text{start media}(j)}\right) + \left(\frac{\text{Become friend}(j, i)}{\text{start SNS}(j)}\right),$$

the relationship period (j, i, t) may denote a value indicating the relationship period of the first user and the second user, the start media (j) may denote a date when the second user j starts using the media service, the first content (j, i) may denote a first date when the second user j sends the content to the first user i, the start SNS(j) may denote a first date when the second user j starts the other service, the become friend (j, i) may denote a date when the second user j and the first user i become friends.

The value indicating closeness of the first user and the second user may be calculated based on the number of contents which are sent by the second user to the first user, the number of likes expressed by the second user to the first user, the number of contents which are sent by the first user to the second user, and the number of likes expressed by the first user to the second user.

The value indicating closeness of the first user and the second user may be calculated based on a condition of $$\text{Closeness}(j, i, t) = \left(\frac{\text{sent content}(j \to i)}{\text{sent content}(j \to i) + \text{sent content}(i \to j)}\right) +$$
$$\left(\frac{\text{like}(j \to i)}{\text{like}(j \to i) + \text{like}(i \to j)}\right),$$

the Closeness (j, i, t) may denote a value indicating closeness of the first user and the second user, the Sent content (j→i) may denote the number of contents which are sent by the second user j to the first user i, the like (j→i) may denote the number of likes expressed by the second user j to the first user i, the Sent content (i→j) may denote the number of contents which are sent by the first user i to the second user j, and the like (i→j) may denote the number of likes expressed by the first user i to the second user j.

The method for providing a trust-based media service may further include controlling access rights to the content which is provided through the media service and other service based on the trust information, wherein during the controlling of access rights, when a value of the trust index corresponding to the trust information exceeds a predetermined threshold value, the access right may be granted to the user, and when the value of the trust index corresponding to the trust information is equal to or lower than the predetermined threshold value, the access right may not be granted to the user.

The method for providing a trust-based media service may further include selectively putting a trustworthy tag to the content provided through the media service and other service based on the trust information, wherein the putting may include: putting a trustworthy tag on a content of the user when a value of the trust index corresponding to the trust information exceeds the predetermined threshold value; and putting an untrustworthy tag on a content of the user when a value of the trust index corresponding to the trust information is equal to or lower than the predetermined threshold value.

The first user may be a content producer and the second user may be a content consumer or the first user may be an analysis requestor who requests trust analysis and the second user may be a respondent.

According to another exemplary embodiment provides an apparatus for providing a trust-based media service. The apparatus includes: a network interface device configured to collect first user related data and second user related data from a media service and other service through a network; and a processor configured to analyze a trust based on the collected data forwarded from the network interface device and obtain trust information including a trust index of the first user or the second user, wherein the trust index is calculated based on a value of trustworthiness for a user obtained based on a first individual measurement index calculated based on the collected data and a value of a relationship between the first user and the second user obtained based on a second individual measurement index calculated based on the collected data.

The first individual measurement index may be calculated based on a value indicating ability for every user calculated based on the number of contents which are produced by a user in the media service and the other service, a value indicating integrity for every user calculated based on the number of times that the user is reported or blocked by another user due to a behavior which violates a rule in the media service and the other service, and a value indicating sincerity for every user calculated based on a standard deviation of a content which is produced by the user in the media service and the other service, and the second individual measurement index may be calculated based on a value indicating similarity of the first user and the second user calculated based on the number of contents which are sent from the first user to another user, the number of contents which are received from another user, the number of contents which are sent from the second user to another user, the number of contents which are received from another user; a value indicating a relationship period of the first user and the second user calculated based on a date when the first user starts using the service, a date when the second user starts using the service, a date when the first user and the second user become friends, and a first date when the second user sends the content to the first user; and a value indicating closeness of the first user and the second user calculated based on the number of contents which are sent by the second user to the first user, the number of likes expressed by the second user to the first user, the number of contents which are sent by the first user to the second user, the number of likes expressed by the first user to the second user.

The processor may include: a trust-based content access controller configured to control an access right to a content provided through the media service and other service according to a predetermined rule using the trust information; and a trust-based content assistant configured to selectively put a tag representing a trustworthiness on a content provided through the media service and other service based on the trust information, wherein when a value of a trust index corresponding to the trust information exceeds a predetermined threshold value, the trust content assistant may put a trustworthy tag on the content of the user and when the value of a trust index corresponding to the trust information is equal to or lower than a predetermined threshold value, the trust content assistant may put an untrustworthy tag on the content of the user.

DETAILED DESCRIPTION OF THE EMBODIMENTS

Figure 1:
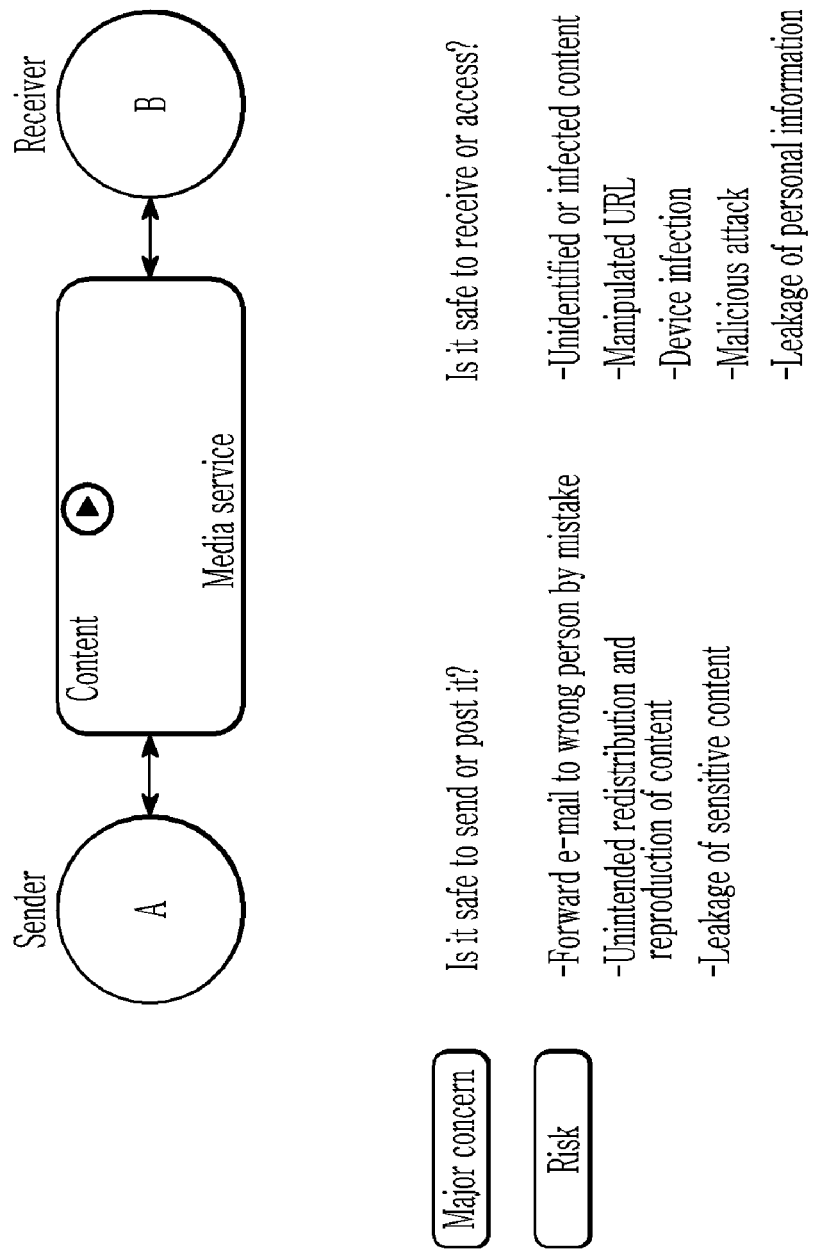
FIG. 1 is an exemplary view illustrating an environment where a media service is provided.

In the following detailed description, only certain exemplary embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising", will be understood to imply the inclusion of stated elements but not the exclusion of any other elements.

The expressions described as a singular form may be construed as a singular or plural unless an explicit expression such as "one" or "single" is not used.

Hereinafter, a method and an apparatus for providing a trust-based media service according to an exemplary embodiment of the present invention will be described.

A media service may be largely classified into a closed media service and an open media service. The closed media service is a service in which a content producer specifies a content consumer to send the contents and for example, includes e-mails and messengers. The open media service is a service in which the content producers share contents with unspecified individuals and for example, includes Facebook and youtube. The method and apparatus according to an exemplary embodiment of the present invention are applicable to both the closed media service and the open media service.

FIG. 1 is an exemplary view illustrating an environment where a media service is provided. As illustrated in FIG. 1, by means of a channel formed between a sender corresponding to a content producer who provides a media service and a receiver corresponding to a consumer who uses the media service, a content corresponding to a media service media service is provided from the sender to the receiver. In this environment, when the content producer and consumers share the contents, uncertainties and risks are present.

In order to solve the problems incurred during the process of sharing the contents, some media services provide reputation information of the content producer. However, the reputation information is analyzed only using data present in the corresponding media service so that it is not analyzed from a multi-dimensional viewpoint.

Figure 2:
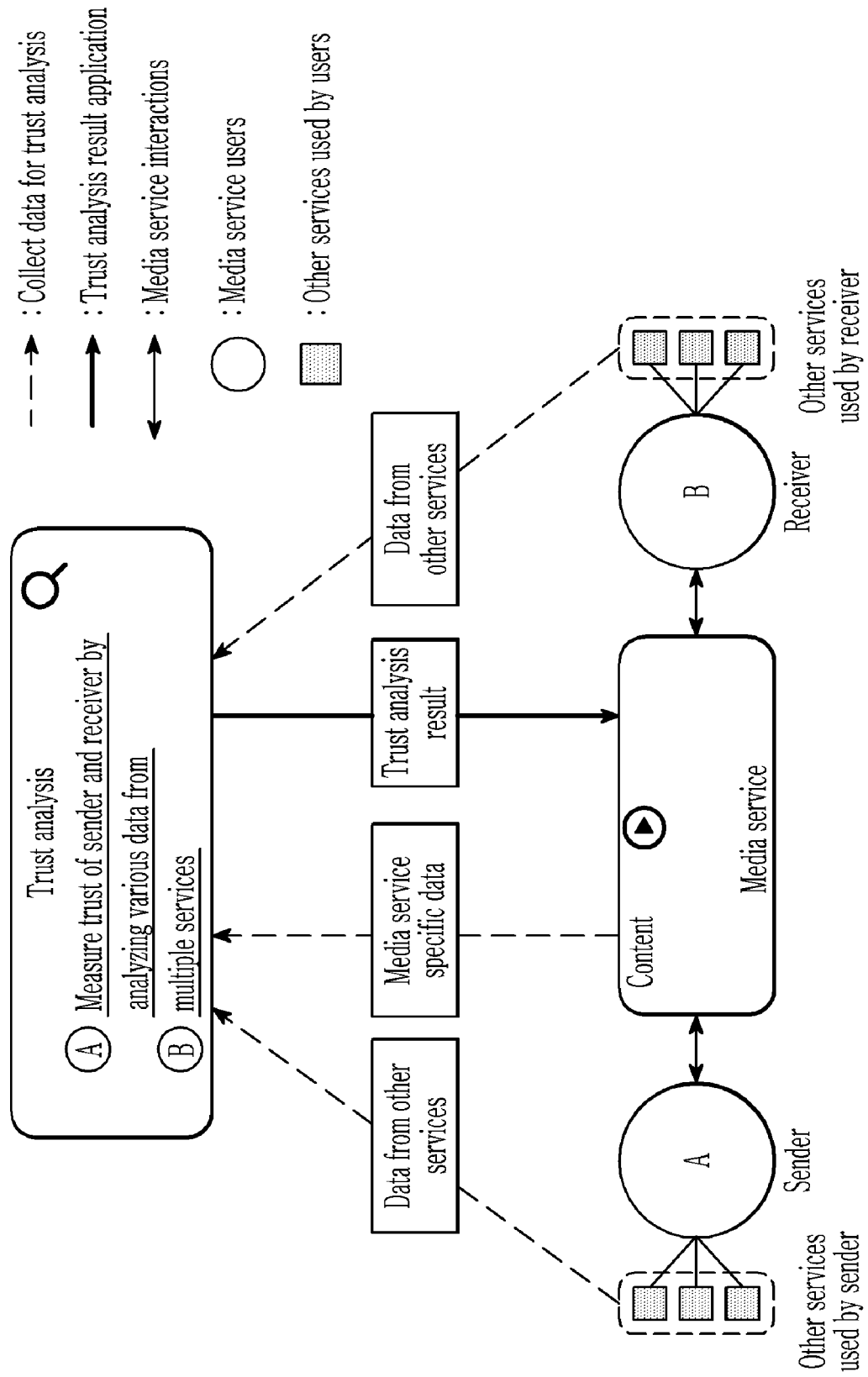
FIG. 2 is a view illustrating by comparing a trust-based media service according to an exemplary embodiment of the present invention with an existing media service.

FIG. 2 is a conceptual view illustrating a trust-based media service according to an exemplary embodiment of the present invention.

In the related art, contents are provided between the sender and receiver and the contents are autonomously investigated by the sender.

In the exemplary embodiment of the present invention, as illustrated in FIG. 2, a trust-based media service is provided. Specifically, data are collected from a sender corresponding to the content producer and a receiver corresponding to a consumer who uses the media service and the trust information of the sender and the receiver are analyzed and provided based on the data. According to an exemplary embodiment of the present invention, trust may be defined as measurable faith and/or confidence which represents a value accumulated in the history and an expected value for the future. Generally, in an academic research, trust is understood as a concept of subjective judgement based on individual perception and cognition but in an exemplary embodiment of the present invention, the trust is considered as an objective value evaluated based on the data.

A difference between a general media service and a trust-based media service according to an exemplary embodiment of the present invention will be summarized as represented in Table 1.

TABLE 1

|  | Existing media service | Trust-based media service |
| --- | --- | --- |
| Object to be analyzed | Contents | Sender and receiver |
| Approach | Content rating Directly investigate suspicious contents | Measure trust |
| Analysis data | Domain specified data User report Content feedback (evaluation) | Multi-dimensional data Media usage behaviors Evaluate content Reputation Social activity in social network |
| Analysis result | Static authorization (For example: media service provider prohibits specific user to evaluate specific content) | Dynamic authorization (For example: even though unreliable consumer consumes contents, unreliable consumer cannot add comment to post) |

In the exemplary embodiment of the present invention, in order to relieve risks and uncertainties inherent in the content sharing, trust information of the content producer and the consumer is analyzed to be visually seen and discriminatory content usage authority is assigned. A principle agent that analyzes the trust information is not a media service provider, but a third party.

Figure 3:
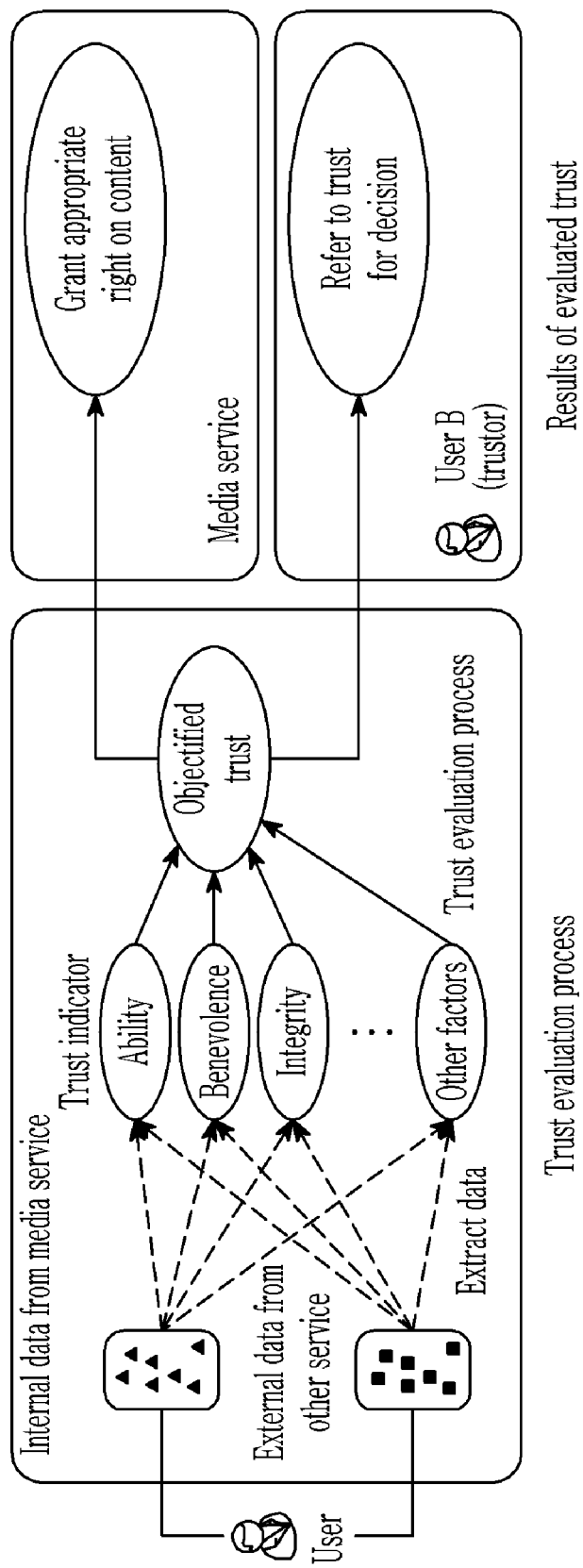
FIG. 3 is a conceptual view of a method for providing a trust-based media service according to an exemplary embodiment of the present invention.
Figure 4:
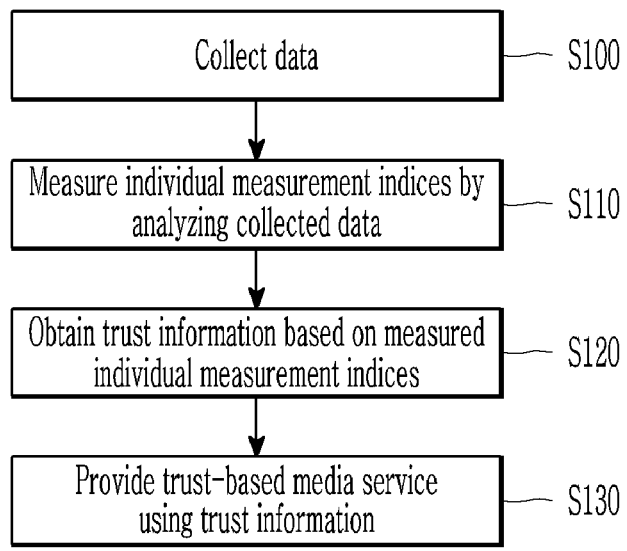
FIG. 4 is an entire flowchart of a method for providing a trust-based media service according to an exemplary embodiment of the present invention.

FIG. 3 is a conceptual view of a method for providing a trust-based media service according to an exemplary embodiment of the present invention and FIG. 4 is an entire flowchart of a method for providing a trust-based media service according to an exemplary embodiment of the present invention.

According to an exemplary embodiment of the present invention, in order to provide a trust-based media service, as illustrated in FIG. 3, first, data (internal data from the media service and external data from other service) is collected from the media service and a different type of service (hereinafter, as an example of the different type of service, a social network service is used, but the present invention is not limited thereto, and is also referred to as other service). The collected data is raw data and filtering may be performed on the data. The trust is analyzed based on the collected data and the collected data is analyzed by a trust analysis model to obtain trust information. Further, the trust-based media service is provided through various application procedures based on the trust information.

More specifically, a method for providing a trust-based media service according to an exemplary embodiment of the present invention will be described with reference to FIG. 4.

First, as illustrated in FIG. 4, data required for a media service and a social network service is collected to analyze a trust of a content producer and a content consumer in step S100. In this case, irrelevant data or repetitive data among the collected data may be filtered.

Data collected through the trust analysis model (or filtered collected data) is analyzed to evaluate and measure individual measurement indicators for obtaining trust information in step S110. Further, the trust information is obtained based on the measured individual measurement indicators in step S120.

Figure 5:
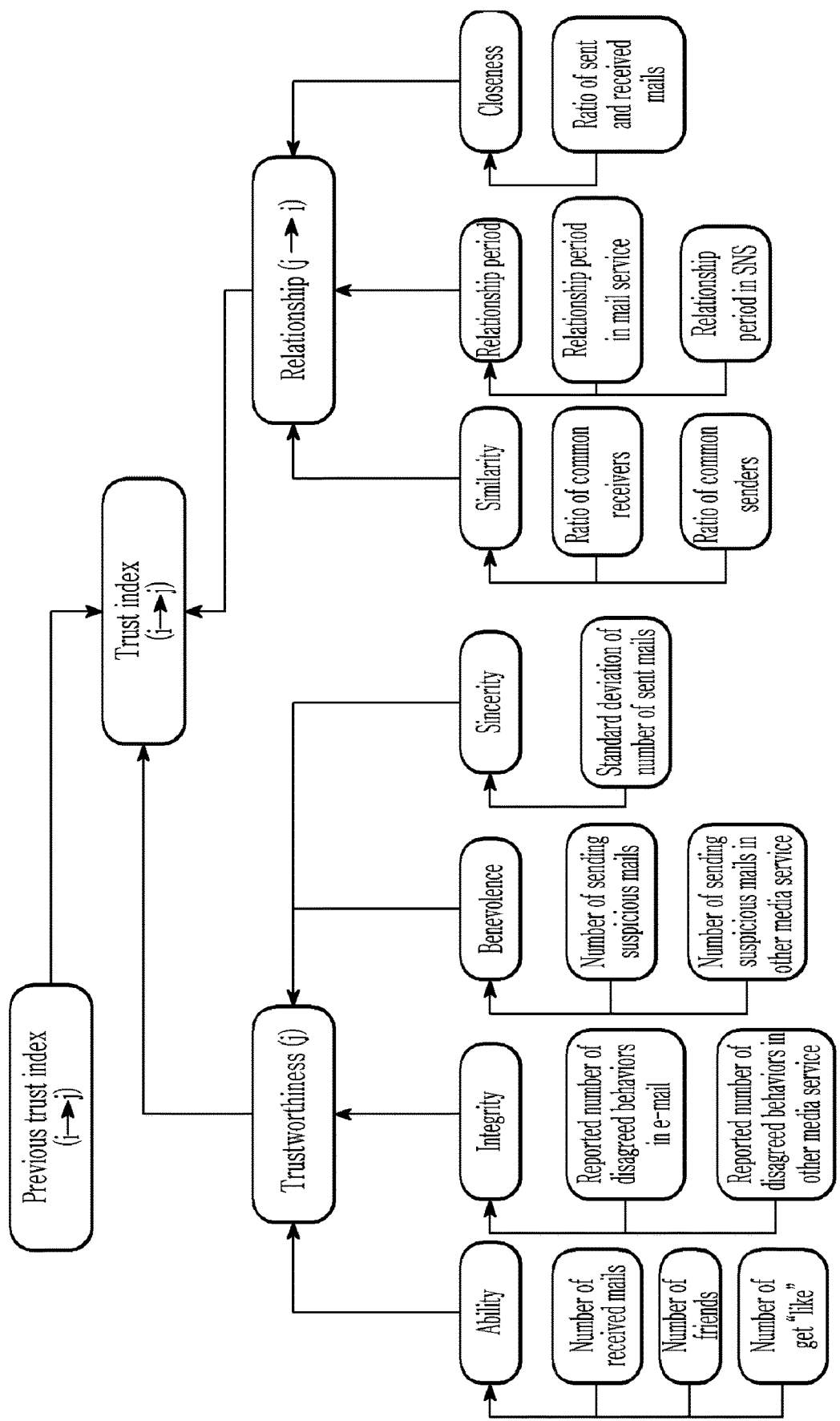
FIG. 5 is a view illustrating a model for trust analysis according to an exemplary embodiment of the present invention.

FIG. 5 is a view illustrating a model for trust analysis according to an exemplary embodiment of the present invention.

In FIG. 5, as a model for trust analysis, a computational trust index model is illustrated.

The trust information (also referred to as a trust index) is based on trustworthiness and relationship. The trustworthiness is based on ability, integrity, and sincerity measured based on data collected from the media service and the social network service and the relationship is based on similarity, relationship period, and closeness measured based on data collected from the media service and the social network service. The individual measurement index includes the ability, the integrity, the sincerity, the similarity, the relationship period, and the closeness.

The trust analysis will be described below based on the above-described model.

First, a trust index of an analysis requestor i with respect to a trustee j at a timing t in the media service is defined as T(i, j, t) and is represented by an equation as follows.

$$T(i,j,t) = \alpha \cdot \text{Trustworthiness}(j,t) + \beta \cdot \text{Relationship}(j,i,t) \quad \text{[Equation 1]}$$

Here, trustworthiness (j, t) represents that j is trustworthy at a timing t, that is, the trustworthiness and is judged based on objective data for j which is irrelevant to the relationship of i and j. The relationship (j, I, t) is a factor that considers the relationship of j and i and represents the relationship of j with respect to i at a timing t. $\alpha$ and $\beta$ are variables.

The trustworthiness (j, t) may be represented by the following Equation 2.

$$\text{Trustworthiness}(j,t) = \sigma \cdot \text{Ability}(j,t) + \tau \cdot \text{Integrity}(j,t)$$
$$\varphi \cdot \text{Benevolence}(j,t) + \phi \cdot \text{Sincerity}(j,t) \quad \text{[Equation 2]}$$

Here, the ability(j, t) represents ability for j at a timing t and the integrity(j, t) represents integrity for j at the timing t, and the benevolence(j, t) represents benevolence for j at the timing t, and the sincerity(j, t) represents sincerity for j at the timing t. $\sigma$, $\tau$, and $\phi$ are variables.

The relationship (j, i, t) may be represented by the following Equation 3.

$$\text{Relationship}(j,i,t) = \gamma \cdot \text{Similarity}(j,i,t) + \delta \cdot \text{Relationship period}(j,i,t) + \varepsilon \cdot \text{Closeness}(j,i,t) \quad \text{[Equation 3]}$$

Here, the similarity (j, t) represents similarity of j with respect to i at a timing t, the relationship period (j, i, t) represent a relationship period of j with respect to i at the timing t, and the closeness(j, i, t) represents a closeness of j with respect to i at the timing t. $\gamma$, $\delta$, and $\varepsilon$ are variables.

The trustworthiness (j, t) is measured by the ability, the integrity, and the sincerity of j. The ability, the integrity, and the sincerity may be evaluated by the data of the media service and a social network service which is used by j and i.

Specifically, the ability (j, t) represents the ability for j at the timing t and may be calculated based on the following Equation 4.

$$\text{Ability}(j, t) = \frac{\text{Number of received mail}_j}{\text{Number of received mail}_j + 1} + \frac{\text{Number of friends}_j}{\text{Number of frinds}_j + 1} + \frac{\text{Number of get "like"}_j}{\text{Number of get "like"}_j + 1} \quad \text{[Equation 4]}$$

Here, "Number of received mail$_j$" denotes a number of mails received by the trustee j, "Number of friends$_j$" denotes the number of friends in a social network of the trustee j, and "Number of get "like"$_j$" denotes the number of get "likes" by the trustee j in the social network.

The integrity (j, t) of the trustee j may be calculated based on the following Equation 5.

$$\text{Integrity}(j,t) = M - (n_{j,A} + n_{j,SNS}) \quad \text{[Equation 5]}$$

Here, M denotes an initial value. $n_{j,A}$ denotes the number of times that the trustee j is reported and blocked by another user in the A media service and $n_{j,SNS}$ denotes the number of times that the trustee j is reported and blocked by another user in the social network SNS.

As represented in Equation 5, the integrity (j, t) of the trustee j is inversely proportional to the number of being reported and blocked by another user until the timing t due to a behavior of j which violates a rule in the media and the social network service. The more the trustee j violates the rule, the lower the integrity.

The Benevolence (j,t) of the trustee j may be calculated based on the number of incidences of sending suspicious mails and the number of incidences of sending suspicious mails in other media service.

The sincerity (j, t) of the trustee j means the consistency of the activity of the trustee j in the media and is calculated based on the following Equation 6.

$$\text{Sincerity}(j, t) = \frac{1}{STD^{j,A}} + \frac{1}{STD^{j,SNS}} \quad \text{[Equation 6]}$$

Here, $STD^{j,A}$ denotes a standard deviation of the contents produced by the trustee j in the media service A until the timing t and $STD^{j,SNS}$ denotes a standard deviation of the contents produced by the trustee j in the social network until the timing t.

The trustworthiness(j,t) is calculated by the ability, the integrity, the sincerity calculated based on the collected data.

In the meantime, the relationship (j→i) is based on the similarity, the relationship period, and the closeness.

The similarity (j, i, t) represents the similarity of j with respect to i at the timing t and is calculated based on the following Equation 7.

$$\text{Similarity}(j, i, t) = \left(\frac{\text{sent content}(i) \cap \text{sent content}(j)}{\text{sent content}(i) \cup \text{sent content}(j)} + \frac{\text{received content}(i) \cap \text{received content}(j)}{\text{received content}(i) \cup \text{received content}(j)}\right) + \left(\frac{\text{friends}(i) \cap \text{friends}(j)}{\text{friends}(i) \cup \text{friend}(j)}\right) \quad \text{[Equation 7]}$$

Here, Sent content(i) denotes the number of contents which is sent to the other people by i until the period t and Sent content(j) denotes the number of contents which is sent to the other people by j until the period t. Received content(i) denotes the number of contents which are received by i from the other people until the period t and received content(j) denotes the number of contents which are received by j from the other people until the period t. Friend (i) denotes a list of friends of i existing in the social network and Friend (j) denotes a list of friends of j existing in the social network. A weight value may be separately assigned to each factor.

If the analysis requestor i and the trustee j send or receive the contents to or from the same target, the similarity increases. Further, the more the common friends of the analysis requestor i and the trustee j, the higher the similarity.

The trustworthiness (j, t) is calculated by the ability, the integrity, and the sincerity calculated based on the data collected as described above.

In the meantime, the relationship period (j, i, t) may be calculated based on the following Equation 8.

$$\text{Relationship period}(j, i, t) = \left(\frac{\text{first content}(j, i)}{\text{start media}(j)}\right) + \left(\frac{\text{Second friend}(j, i)}{\text{start SNS}(j)}\right) \quad \text{[Equation 8]}$$

Here, a start media (j) denotes a date when j starts using the media service, a first content (j, i) denotes a first date when j sends contents to i. A start SNS(j) denotes a first date when j starts using SNS and a become friend (j, i) denotes a date when j and i become friends. A unit of time is calculated as a date.

The relationship period is increased when the user have a relationship in a plurality of services.

The closeness (j, i, t) may be calculated based on the following Equation 9.

$$\text{Closeness}(j, i, t) = \left(\frac{\text{sent content}(j \to i)}{\text{sent content}(j \to i) + \text{sent content}(i \to j)}\right) + \left(\frac{\text{like}(j \to i)}{\text{like}(j \to i) + \text{like}(i \to j)}\right) \quad \text{[Equation 9]}$$

Here, Sent content (j→i) denotes the number of contents which are sent from j to i and like (j→i) denotes the number of likes expressed by j to i (the number of "like" expressions). The sent content (i→j) denotes the number of contents sent from i to j and the like (i→j) denotes the number of likes expressed by i to j.

The relationship (j→i) is calculated based on the similarity, the relationship period, and the closeness calculated based on the data collected as described above.

Further, a trust index T(i, j, t) of the analysis requestor i with respect to the trustee j is calculated by Equation 1 based on the trustworthiness (j,t) and the relationship (j→i).

As described above, after obtaining the trust index, that is, the trust information, the trust-based media service is provided using the trust information in step S130.

Next, specific exemplary embodiments which provide a trust-based media service using the trust information measured by the exemplary embodiment of the present invention will be described.

Figure 6:
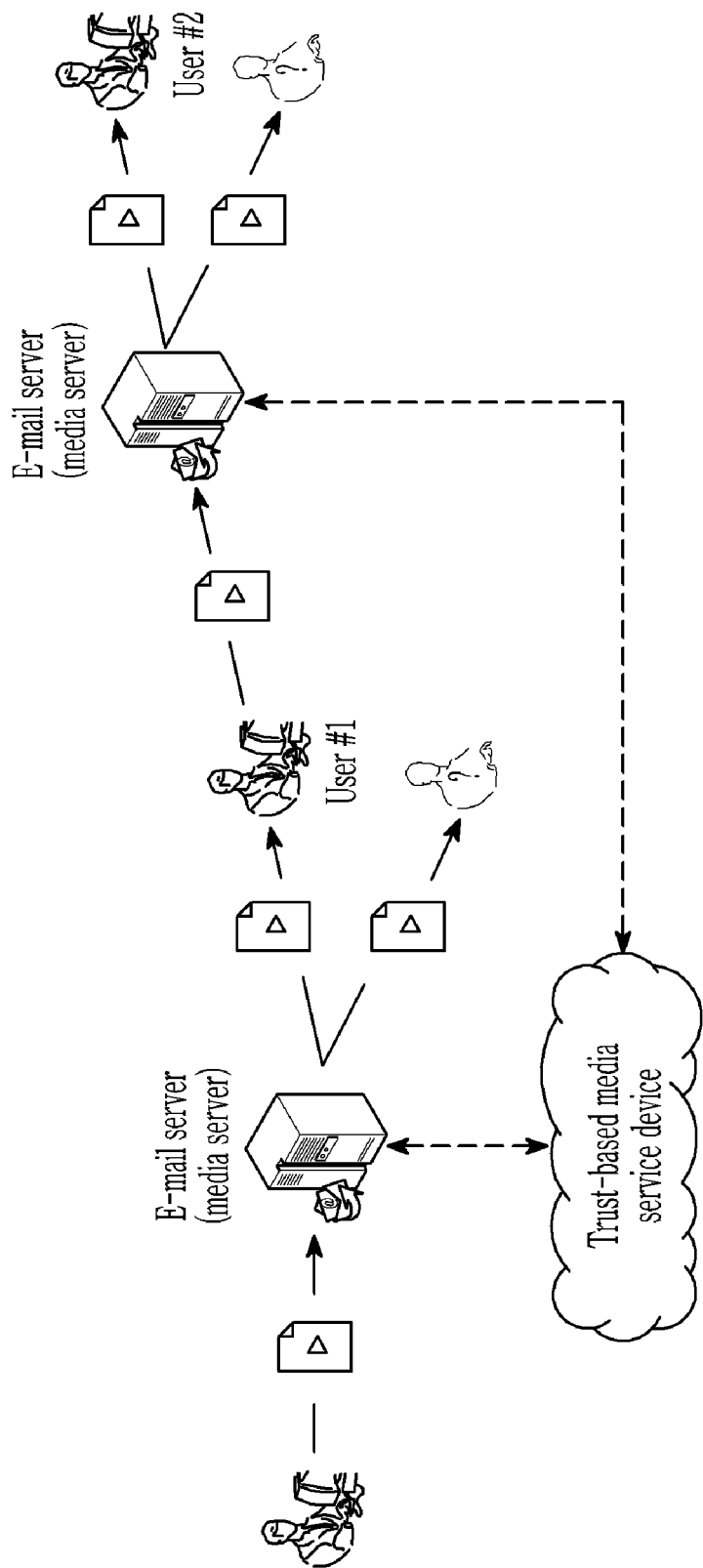
FIG. 6 is an exemplary view when a trust-based media service according to a first exemplary embodiment of the present invention is provided.

FIG. 6 is an exemplary view when a trust-based media service according to a first exemplary embodiment of the present invention is provided.

First, as illustrated in FIG. 6, a trust-based media service for a closed media, that is, a trust-based content consuming service may be provided. The closed media service indicates a media service which specifies a recipient and sends the content, such as an e-mail. When as an example of the closed media service, the e-mail service is described, as illustrated in FIG. 6, e-mail is sent between users (user #1 and user #2) through an e-mail server. In the case of the closed media service, an immediate risk of the content sender is unintentional retransmission and an immediate risk of the receiver is reception of contents from unidentified senders.

Figure 7:
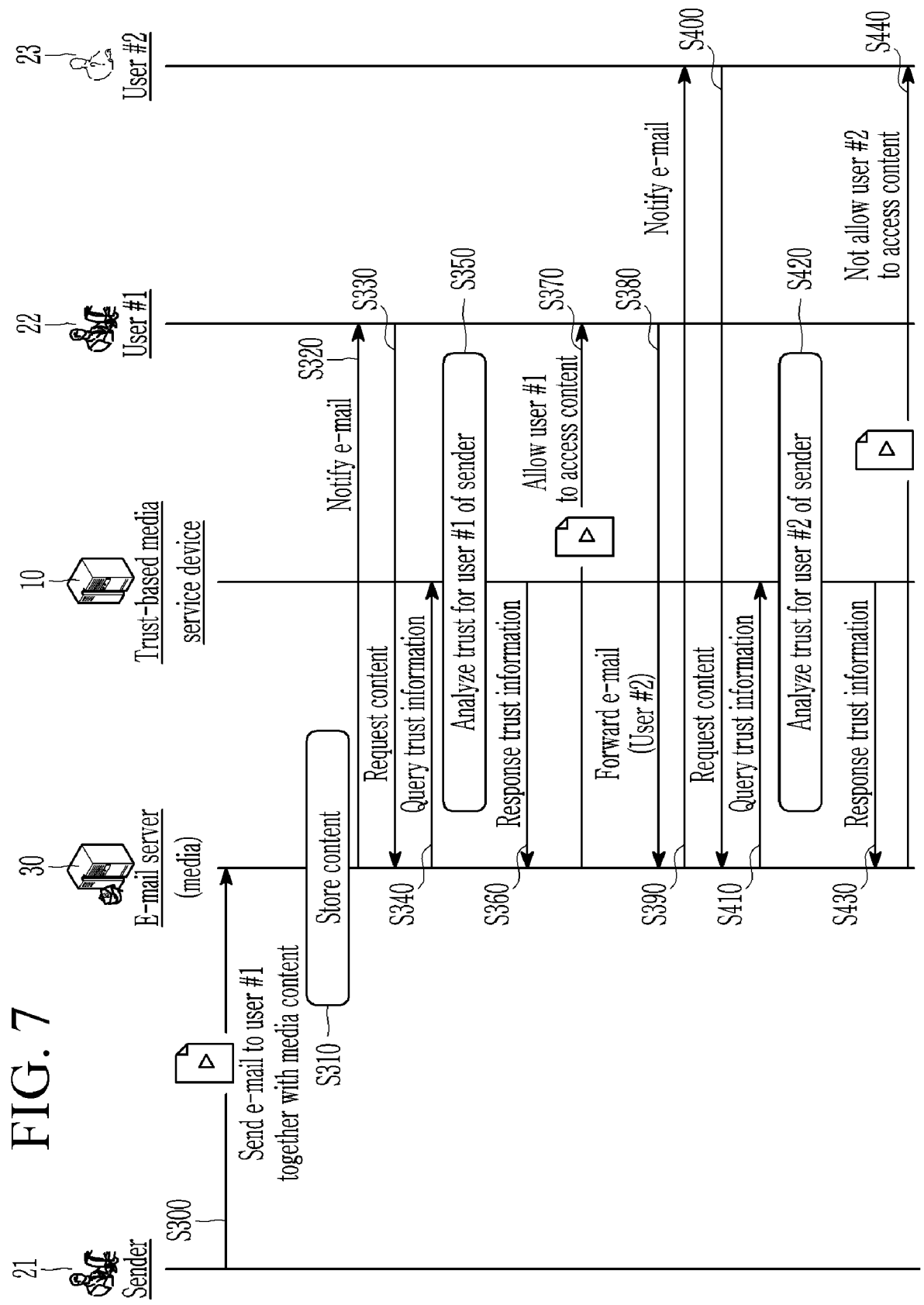
FIG. 7 is a flowchart of a method for providing a trust-based media service according to a first exemplary embodiment of the present invention.

FIG. 7 is a flowchart of a method for providing a trust-based media service according to a first exemplary embodiment of the present invention. Specifically, FIG. 7 illustrates a flow of information of a trust-based content consuming service from a viewpoint of a sender for the closed media.

When a terminal 21 of a sender (here, the sender may be a producer of the content or an owner of the content) tries to send an e-mail to user #1, it is requested to send an e-mail media with user #1 specified as a recipient together with the media content in step S300.

An e-mail server 30 receives an e-mail sending request from the terminal 21 of the sender and stores the attached media content in step S310. The e-mail server 30 notifies to the terminal 22 of users #1 which is specified as the recipient that the e-mail is forwarded in step S320 and then when a message requesting the contents related to the e-mail is received from the terminal 22 of user #1 in step S330, requests the trust information of the sender to the trust-based media service device 10 in step S340.

The trust-based media service device 10 analyzes the trust for user #1 of the sender in the above-described method to calculate trust information and forwards the calculated trust information to the e-mail server 30 in steps S350 and S360.

The e-mail server 30 determines whether to access the e-mail based on the trust information for user #1 of the sender which is forwarded from the trust-based media service device 10. When it is determined that access is possible (for example, a trust index corresponding to the trust information for user #1 of the sender exceeds a predetermined threshold value), the e-mail server notifies the terminal 22 of user #1 that access to the content of the e-mail is allowed in step S370. By doing this, the terminal 22 of user #1 accesses the contents of the e-mail to allow user #1 to check the e-mail.

In the meantime, when the terminal 22 of user #1 request to forward the e-mail to the other user, for example, user #2 in step S380, the e-mail server 30 notifies a terminal 23 of user #2 that the e-mail is received in step S390. Thereafter, when a message requesting an e-mail related content from the terminal 23 of user #2 is received in step S400, the e-mail server 30 requests the trust information of user #1 which is a forwarding requestor, that is, user #1 to the trust-based media service device 10 in step S410.

The trust-based media service device 10 analyzes the trust for user #2 of user #1 as described in the above-described method to calculate trust information and forwards the calculated trust information to the e-mail server 30 in steps S420 and S430.

The e-mail server 30 determines whether to access the e-mail based on the trust information for user #2 of user #1 forwarded from the trust-based media service device 10 and when it is determined that the access is not possible (for example, a trust index for user #2 of user #1 is equal to or lower than a predetermined threshold value) notifies the terminal 23 of user #2 that the access to the content of the e-mail is not allowed in step S440. Therefore, since user #2 is an untrustworthy user, user #2 is not allowed to access the content of the e-mail forwarded from the terminal 22 of user #1.

Figure 8:
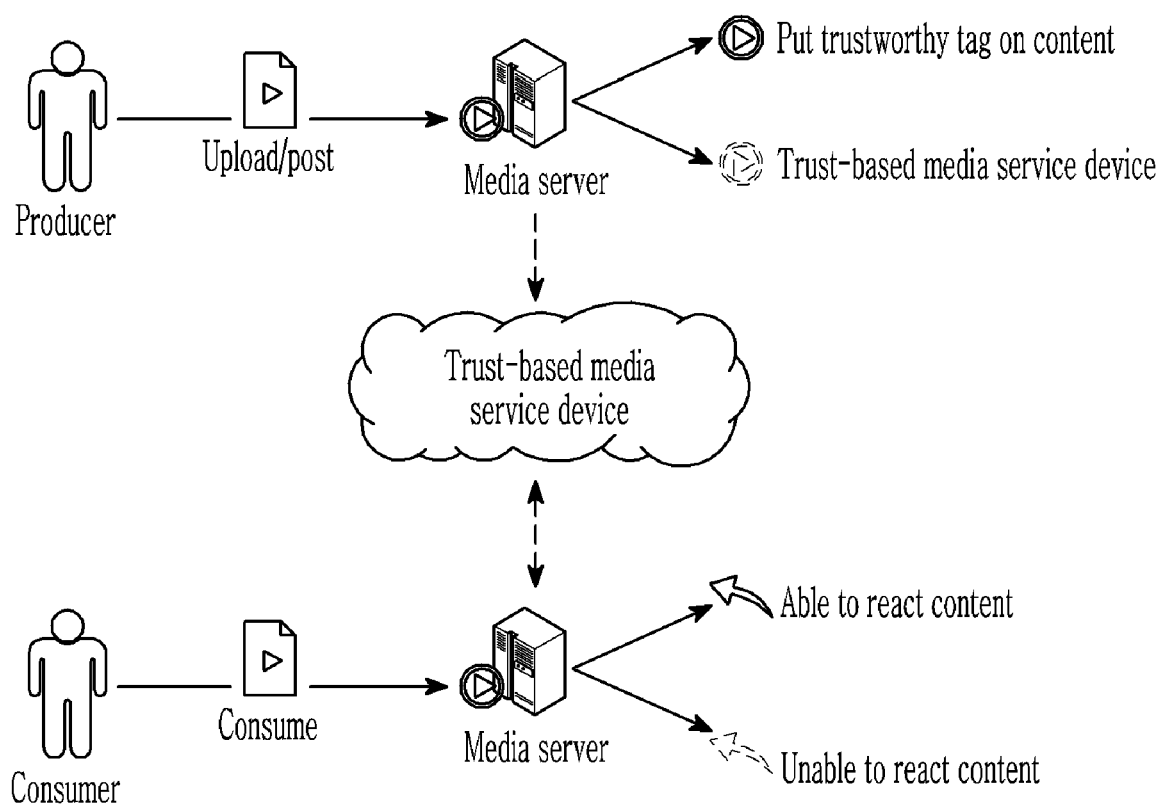
FIG. 8 is an exemplary view when a trust-based media service according to a second exemplary embodiment of the present invention is provided.

FIG. 8 is an exemplary view when a trust-based media service according to a second exemplary embodiment of the present invention is provided.

Here, a trust-based media service for an open media, that is, a trust-based content sharing service is provided. The open media service means a media service for sharing contents with unspecified individuals such as youtube or Facebook. As illustrated in FIG. 8, in the case of a media service for sharing contents, a content producer uploads or posts the contents to the media server and a content consumer consumes the contents through the media server. The media server interworks with the trust-based media service device 10 according to the exemplary embodiment of the present invention to share the contents between the content producer and the content consumers. Specifically, the trust-based media service device 10 according to the exemplary embodiment of the present invention analyzes and calculates trust information for the content producer to provide the trust information to the media server and the media server puts a trustworthiness tag on the content in accordance with the trust information of the content producer. The trustworthiness tag is based on the trust information (trust index) calculated based on the above-described Equation 1. For example when the trust information exceeds a predetermined threshold value, the trustworthiness tag is put on the content and when the trust information is equal to or lower than the predetermined threshold value, "untrustworthy tag" is put on the content.

Figure 9:
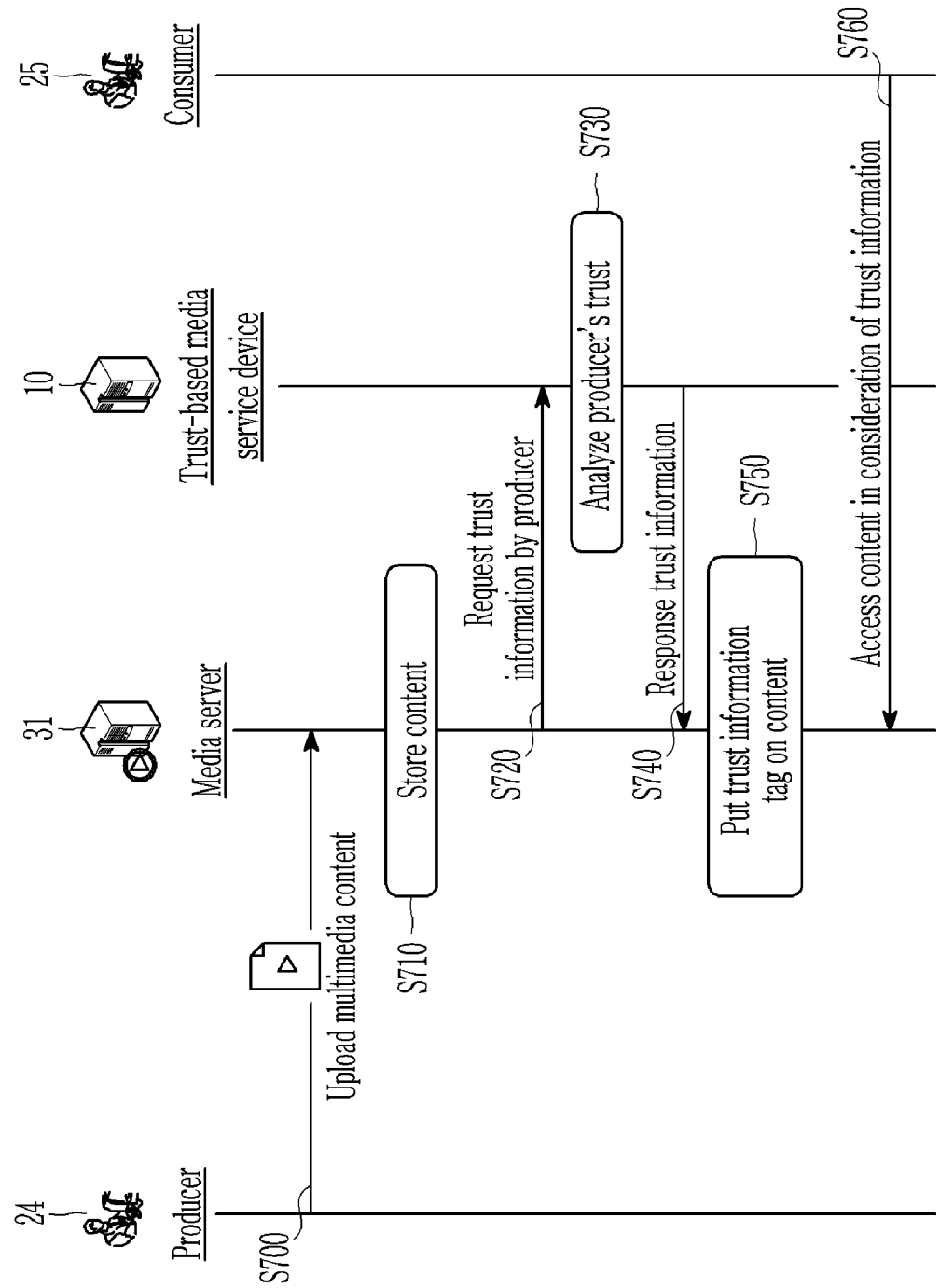
FIG. 9 is a flowchart of a method for providing a trust-based media service according to a second exemplary embodiment of the present invention.

FIG. 9 is a flowchart of a method for providing a trust-based media service according to a second exemplary embodiment of the present invention. Specifically, FIG. 9 illustrates a flow of information when a trust-based content sharing service is used, from a viewpoint of a content consumer for an open media.

As illustrated in FIG. 9, the content producer uploads the contents. When the content is forwarded from a terminal 24 of a content producer in step S700, the media server 31 stores the content in step S710. The media server 31 requests trust information of the content producer to the trust-based media service device 10 in step S720.

As described in the above-described method, the trust-based media service device 10 analyzes the trust of the content producer to calculate trust information and forwards the calculated trust information to the media server 31 in steps S730 and S740.

The media server 31 puts a trustworthy tag or an untrustworthy tag on the content based on the trust information of the content user forwarded from the trust-based media service device 10. For example, when the trust information exceeds a predetermined threshold value, the media server 31 may put a trustworthy tag on the content and when the trust information is equal to or lower than the predetermined threshold value, puts an unreliable untrustworthy tag on the content in step S750.

As described above, a content put with a tag based on the trust information is provided to other users and the content consumer may identify the content which is produced by an unreliable content producer in advance by referring to the trustworthy tag/untrustworthy tag put on the content before consuming the content and thus consumes the trustworthy contents.

Figure 10:
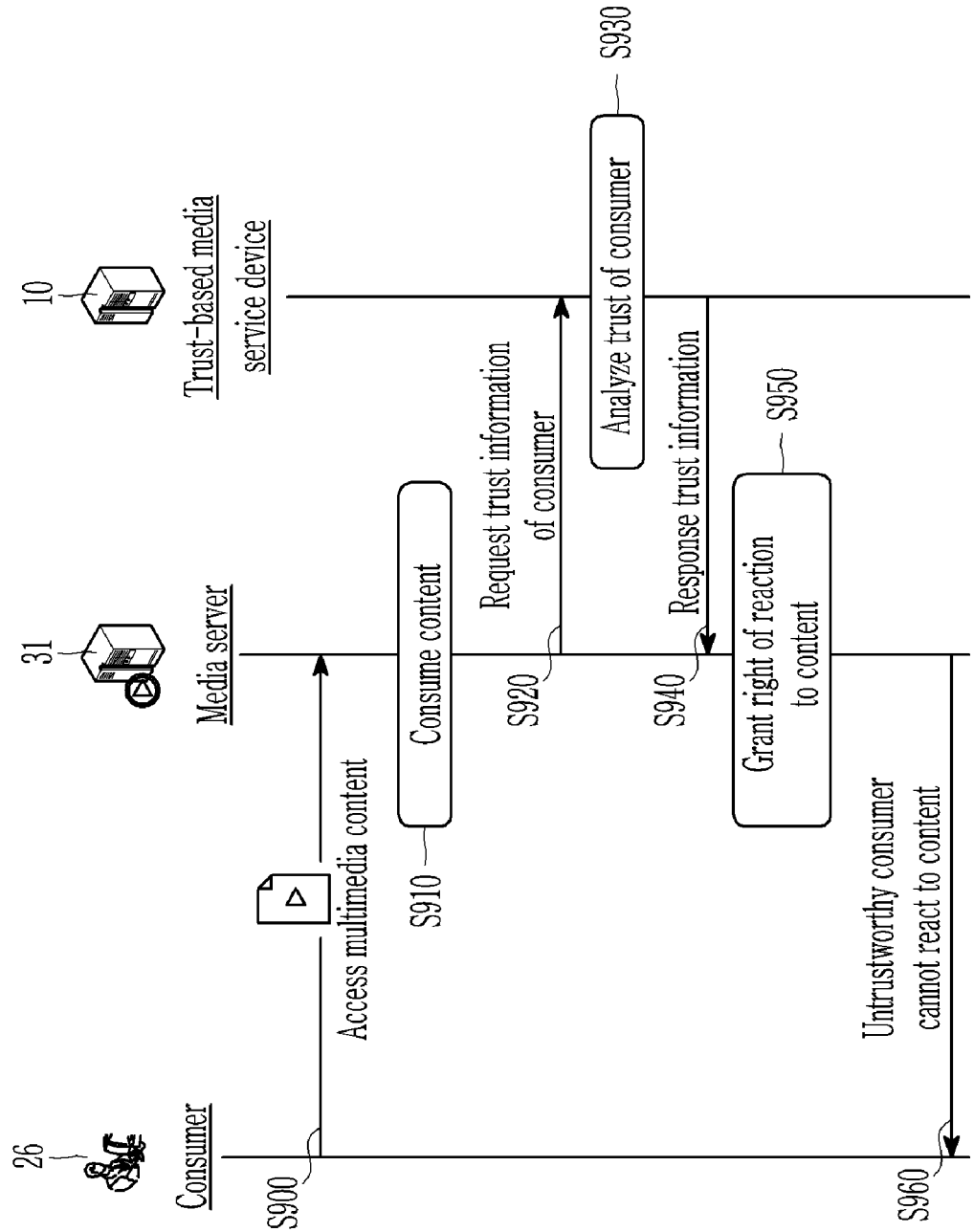
FIG. 10 is another flowchart of a method for providing a trust-based media service according to a second exemplary embodiment of the present invention.

FIG. 10 is another flowchart of a method for providing a trust-based media service according to a second exemplary embodiment of the present invention. Specifically, FIG. 10 illustrates a flow of information when a trust-based content sharing service is used, from a viewpoint of a content producer for an open media.

As illustrated in FIG. 10, when a terminal 26 of a content consumer tries to access the media server to consume the content, the media server 31 allows the consumption of content in steps S900 and S910 and requests the trust information of the content consumer to the trust-based media service device 10 to determine whether to allow reaction for the content in step S920. Here, the content reaction includes commenting on the content, downloading the contents, and evaluation of the contents (for example, rating).

As described in the above-described method, the trust-based media service device 10 analyzes the trust of the content consumer and forwards the calculated trust information to the media server 31 in steps S930 and S940.

The media server 31 determines whether to allow the reaction of the content consumer for the content based on the trust information of the content consumer forwarded from the trust-based media service device 10. For example, when the trust information exceeds a predetermined threshold value, reaction for the content is allowed and when the trust information is equal to or lower than the predetermined threshold value, the reaction for the content is now allowed in step S950. A result on whether to allow the reaction based on the trust information may be provided to a terminal 26 of the content consumer and particularly, when the reaction is not allowed, this may be notified to the content consumer in step S960.

According to the exemplary embodiment, even though the trust index of the content consumer is equal to or lower than a specific reference value, the content consumer may consume the content but the commenting, the downloading, and evaluation (rating) which are reactions for the content are not allowed.

Figure 11:
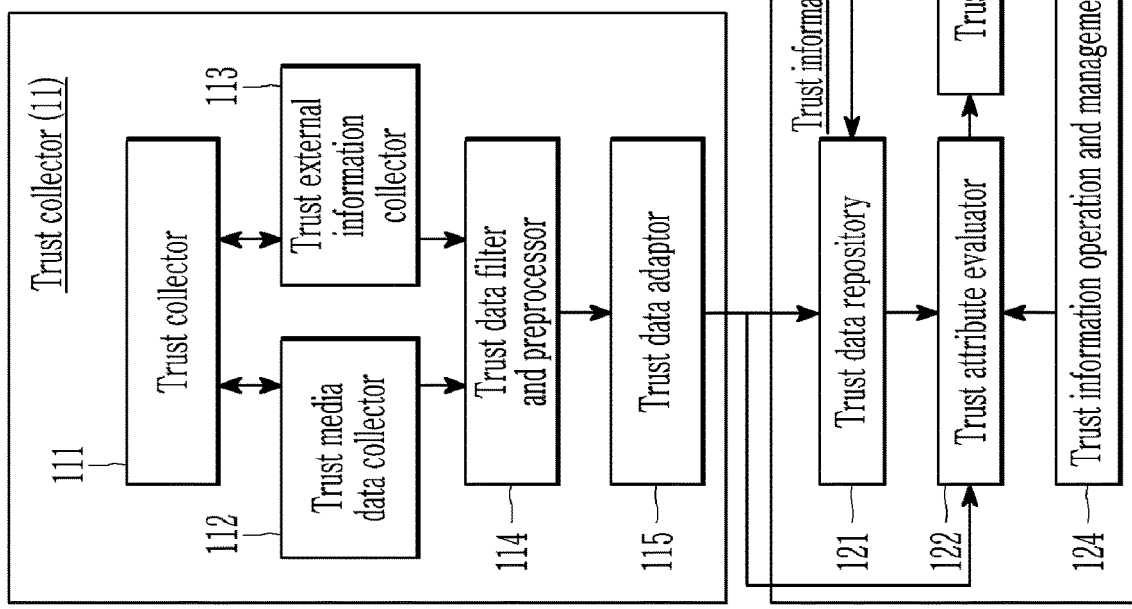
FIG. 11 is a view illustrating a structure of a trust-based media service device according to an exemplary embodiment of the present invention.

FIG. 11 is a view illustrating a structure of a trust-based media service device according to an exemplary embodiment of the present invention.

As illustrated in FIG. 11, a trust-based media service device 10 according to an exemplary embodiment of the present invention includes a trust collecting unit 11, a trust information management unit 12, and a trust service enabler 13. A media service provider may directly analyze the trust of the content producer and a content consumer or entrust a third party to analyze the trust and the trust-based media service device 10 analyzes the trust of the content producer and the content consumer.

The trust collecting unit 11 is configured to collect raw data for producing trust information. To this end, the trust collecting unit 11 includes a trust interface 111, a trust media data collector 112, a trust external information collector 113, a trust data filter and preprocessor 114, and a trust data adaptor 115.

The trust interface 111 is configured to perform a connection function with a service in which trust related data exists. For example, the trust interface 111 performs a connection function with devices such as an e-mail server, a media server, or a terminal of a user.

The trust media data collector 112 and a trust external information collector 113 are configured to collect raw data for producing trust information through the trust interface 111. Specifically, the trust media data collector 112 is configured to collect content producer related data and content consumer related data (for example, content usage data) present in the media service. The trust external information collector 113 is configured to collect content producer related data and content consumer related data from other service (for example, a social network service) other than the media service.

The trust data filter and preprocessor 114 is configured to analyze and filter irrelevant or repetitive data among data collected by the trust media data collector 112 and the trust external information collector 113 in advance.

The trust data adaptor 115 is configured to forward collected data (or collected data which is filtered by the trust data filter and preprocessor 114) to the trust information management unit 12.

In the meantime, the trust information management unit 12 is configured to analyze and evaluate the trusts of the content producer and the content consumer based on the collected data to produce trust information. To this end, the trust information management unit 12 includes a trust attribute evaluator 121, a trust data repository 122, a trust index calculator 123, and a trust information operation and management unit 124.

The trust attribute evaluator 121 is configured to measure individual measurement indices (ability, integrity, sincerity, similarity, relationship period, and closeness) in accordance with a predetermined trust analysis model based on the collected data which is forwarded from the trust collector 11.

The trust data repository 122 is configured to store collected data forwarded from the trust collector 11 and in this case, the collected data may be stored without leaking personal information.

The trust index calculator 123 is configured to analyze the trust for the content producer and the content consumer to obtain a trust index. The trust index calculator 123 measures the trustworthiness and the relationship as described above, based on the individual measurement indices forwarded from the trust attribute evaluator 121 and calculates the trust index based thereon. The calculated trust index is managed as trust information. Such trust information may be stored in the trust data storage 122 to be managed.

The trust information operation and management unit 124 is configured to provide information which is operated and maintained by a system manager while checking a trust information management platform.

In the meantime, the trust service enabler 13 is configured to perform a function of granting a right based on the trust through the analyzed and calculated trust index. To this end, the trust service enabler 13 includes a trust linking unit 131, a trust-based content access controller 132, a trust-based content assistant 133, and a trust application interface 134.

The trust linking unit 131 is configured to perform a function of connecting the trust-based media service device 10, particularly, the trust information management unit 12 and the media service.

The trust-based content access controller 132 is configured to perform a function of restricting content producing and consuming rights according to a predetermined rule using trust information of the content producer and the content consumer deduced by the trust information management unit 12. For example, the trust-based content access controller 132 may allow to selectively upload or post contents of the content producer based on the trust information of the content producer. Alternatively, the trust-based content access controller 132 may allow to selectively react to or forward the contents of the content consumer based on the trust information of the content consumer.

The trust-based content assistant 133 is configured to perform a function of putting a trustworthy tag/untrustworthy tag on the content according to a trust index analyzed for a specific content and a predetermined rule.

The trust application interface 134 is configured to perform a function of an application program interface (API) to process the application with a media service provider and a media service user (a content producer or a content consumer).

Figure 12:
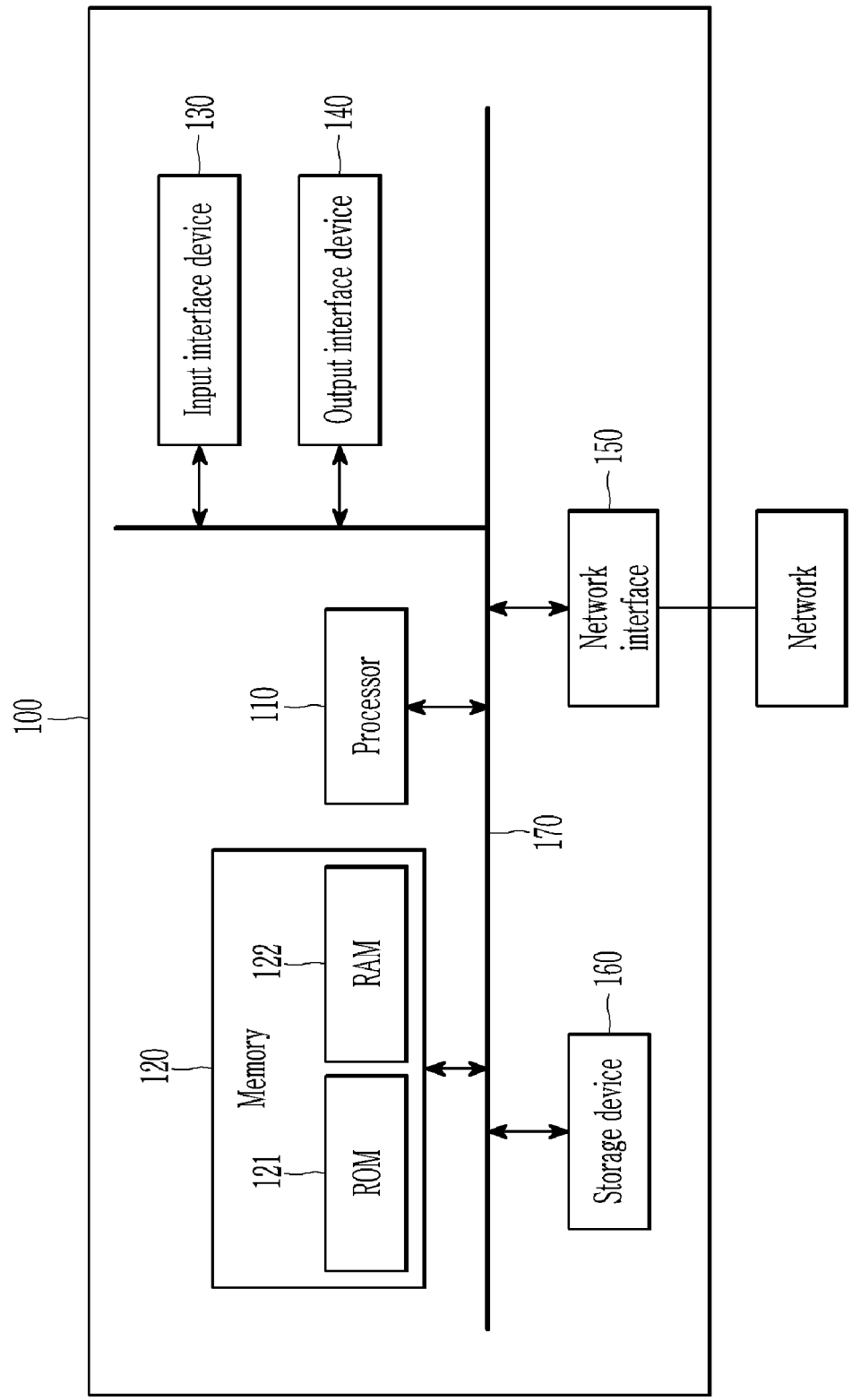
FIG. 12 a view illustrating a structure of a trust-based media service device according to another exemplary embodiment of the present invention.

FIG. 12 is a view illustrating a structure of a trust-based media service device according to another exemplary embodiment of the present invention.

As illustrated in FIG. 12, a trust-based media service device 100 according to an exemplary embodiment of the present invention includes a processor 110, a memory 120, an input interface device 130, an output interface device 140, a network interface 150, and a storage device 160 which communicate with each other through a bus 170.

The processor 110 may be configured to embody the methods described with reference to FIGS. 1 to 10. Further, the processor 110 may be configured to perform the functions as the trust collector, the trust information management unit, and the trust service enabler. The processor 110 may be a central processing unit (CPU) or a semiconductor device which executes commands stored in the memory 120 or the storage device 160.

The memory 120 is connected to the processor 110 and stores various information related to an operation of the processor 110. The memory 120 may store instructions which may be executed by the processor 110 or load the instructions from the storage device 160 to temporarily store the instructions. The processor 110 may execute the instructions which is stored in the memory 120 or loaded from the memory. The memory may include a read only memory (ROM) 121 and a random access memory (RAM) 122.

According to an exemplary embodiment of the present invention, the memory 120 may be located inside or outside the processor 110 or connected to the processor 110 through various known units.

The network interface device 150 is connected to the network to be configured to transmit/receive a signal. The network interface device 150 may be configured to transmit/receive signals to/from a device of a media service provider and a terminal of a media service user which are connected via a network. By doing this, the media service user (a content producer or a content consumer) related data may be collected and trust information of the media service user may be provided.

According to the exemplary embodiments of the present invention, the following effects are provided.

First, according to the exemplary embodiment of the present invention, explicit trust information is provided so that risks and uncertainties inherent in production and consumption of contents may be diagnosed in advance.

Second, according to the exemplary embodiment of the present invention, the users may more safely produce and consume media contents. Third, even though the related art provides evaluation information of contents or content producers only through data generated from the media service, according to the exemplary embodiment of the present invention, it is possible to provide stereoscopic and diverse trust information using data of an external service such as a social network service as well as a media service.

Fourth, according to an exemplary embodiment of the present invention, the trust information of the content producer and the consumer is provided so that contaminated knowledge information such as fake news may be detected in advance.

Fifth, according to the exemplary embodiment of the present invention, risks and uncertainties generated during the content producing and consuming process are detected in advance and relieved so that ultimately, it is possible to contribute to activation of the media content ecosystem.

Sixth, the explicit trust information of the content producer and the content consumer is calculated to be utilized and a third-party based trust analysis may be performed.

It should be understood that the method and the apparatus disclosed in the exemplary embodiments of the present invention may be implemented in different ways. For example, the disclosed apparatus of the exemplary embodiment is merely an example. For example, distinction of each unit of the device is merely a logical functional distinction and may be a different distinction during actual implementation. For example, a plurality of units or components is combined or integrated with another device or some functions are ignored or not performed. Further, units configured to perform a method according to an exemplary embodiment of the present invention may be integrated in one device or physically separately provided or two or more units may be combined as one unit. Each unit configured to perform the method described in the above-described exemplary embodiments may be implemented as a hardware or as a software function unit.

The exemplary embodiments of the present invention are not embodied only by the above-described apparatus and method. Alternatively, the above-mentioned exemplary embodiments may be embodied by a program performing functions, which correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for providing a trust-based media service, comprising:
    collecting first user related data and second user related data from a media service and another service;
    analyzing a trust based on the collected data and obtaining trust information including a trust index of a first user or a second user based on a result of the analyzing; and providing the trust information; and
    controlling an access right to a content which is provided by the first user through each of the media service and the other service based on the trust information,
    wherein during the controlling of the access right, when a value of the trust index corresponding to the trust information exceeds a predetermined threshold value, the access right is granted to the second user that receives the content, and when the value of the trust index corresponding to the trust information is equal to or lower than the predetermined threshold value, the access right is not granted to the second user,
    wherein the trust index is calculated based on a value of trustworthiness for each of the first user and the second user that is obtained based on a first individual measurement index calculated based on the collected data and a value of a relationship between the first user and the second user obtained based on a second individual measurement index calculated based on the collected data,
    wherein the first individual measurement index is calculated based on a value indicating ability for every user, a value indicating integrity for every user, a value indicating benevolence for every user, and a value indicating sincerity for every user, and
    wherein the value indicating integrity for every user is based on a sum of the number of times that a user j is reported and blocked by another user in the media service and the number of times that the user j is reported and blocked by the other user in the other service.

2. The method for providing a trust-based media service of claim 1,
    the second individual measurement index is calculated based on a value indicating a similarity of the first user and the second user, a value indicating a relationship period of the first user and the second user, and a value indicating closeness of the first user and the second user.

3. The method for providing a trust-based media service of claim 2, wherein the value indicating ability is calculated based on the number of mails received in the media service and the other service, the number of friends, and the number of get "likes".

4. The method for providing a trust-based media service of claim 3, wherein the value indicating ability is calculated based on a condition of the following equation, $$\text{Ability}(j, t) = \frac{\text{Number of received mail}_j}{\text{Number of received mail}_j + 1} +$$

$$\frac{\text{Number of friends}_j}{\text{Number of frinds}_j + 1} + \frac{\text{Number of get "like"}_j}{\text{Number of get "like"}_j + 1}$$

where the Ability (j, t) denotes a value indicating an ability for the user j at a timing t, the "Number of received mailj" denotes the number of mails received by the user j, "Number of friendsj" denotes the number of friends of the user j in a social network, and "Number of get "like"j " denotes the number of get "likes" by the user j in the social network.

5. The method for providing a trust-based media service of claim 2, wherein the value indicating similarity of the first user and the second user is calculated based on the number of contents which are sent from the first user to another user, the number of contents which are received from another user, the number of contents which are sent from the second user to another user, and the number of contents which are received from another user.

6. The method for providing a trust-based media service of claim 5, wherein the value indicating similarity of the first user and the second user is calculated based on a condition of $$\text{Similarity}(j, i, t) = \left( \frac{\text{sent content}(i) \cap \text{sent content}(j)}{\text{sent content}(i) \cup \text{sent content}(j)} + \right.$$

$$\left. \frac{\text{received content}(i) \cap \text{received content}(j)}{\text{received content}(i) \cup \text{received content}(j)} \right) +$$

$$\left( \frac{\text{friends}(i) \cap \text{friends}(j)}{\text{friends}(i) \cup \text{friend}(j)} \right),$$

where the Similarity (j, i, t) denotes a value indicating similarity of the second user for the first user i at a timing t, the Sent content(i) denotes the number of contents which are sent by the first user i to another user until the timing t, the Sent content(j) denotes the number of contents which are sent by the second user j to another user until the timing t, the received content(i) denotes the number of contents which are received by the first user i from another user until the timing t, the received content(j) denotes the number of contents which are received by the second user j from another user until the timing t, the Friend (i) denotes a list of friends of the first user i in the other service, and the Friend (j) denotes a list of friends of the second user j in the other service.

7. The apparatus for providing a trust-based media service of claim 5, wherein the first user is a content producer and the second user is a content consumer or the first user is an analysis requestor who requests trust analysis and the second user is a respondent.

8. The method for providing a trust-based media service of claim 2, wherein the value indicating a relationship period of the first user and the second user is calculated based on a date when the first user starts using the service, a date when the second user starts using the service, a date when the first user and the second user become friends, and a first date when the second user sends the content to the first user.

9. The method for providing a trust-based media service of claim 8, wherein the value indicating the relationship period of the first user and the second user is calculated based on a condition of $$\text{Relationship period }(j, i, t) =$$
$$\left(\frac{\text{first content }(j, i)}{\text{start media }(j)}\right) + \left(\frac{\text{Second friend }(j, i)}{\text{start SNS }(j)}\right),$$

where the relationship period (j, i, t) denotes a value indicating the relationship period of the first user and the second user, the start media (j) denotes a date when the second user j starts using the media service, the first content (j, i) denotes a first date when the second user j sends the content to the first user i, the start SNS(j) denotes a first date when the second user j starts the other service, the become friend (j, i) denotes a date when the second user j and the first user i become friends.

10. The method for providing a trust-based media service of claim 2, wherein:
the value indicating closeness of the first user and the second user is calculated based on the number of contents which are sent by the second user to the first user, the number of likes expressed by the second user to the first user, the number of contents which are sent by the first user to the second user, and the number of likes expressed by the first user to the second user.

11. The method for providing a trust-based media service of claim 10, wherein the value indicating closeness of the first user and the second user is calculated based on a condition of $$\text{Closeness }(j, i, t) = \left(\frac{\text{sent content }(j \to i)}{\text{sent content }(j \to i) + \text{sent content }(i \to j)}\right) + \left(\frac{\text{like }(j \to i)}{\text{like }(j \to i) + \text{like }(i \to j)}\right),$$

where the Closeness (j, i, t) denotes a value indicating closeness of the first user and the second user, the Sent content (j→i) denotes the number of contents which are sent by the second user j to the first user i, the like (j→i) denotes the number of likes expressed by the second user j to the first user i, the Sent content (i→j) denotes the number of contents which are sent by the first user i to the second user j, and the like (i→j) denotes the number of likes expressed by the first user i to the second user j.

12. The method for providing a trust-based media service of claim 1, wherein the value indicating integrity is calculated based on a condition of Integrity(j,t)=M−($n_{j,A}$+$n_{j,SNS}$), where the Integrity (j, t) denotes a value indicating integrity for the user j at a timing t, M denotes an initial value, the $n_{j,A}$ denotes the number of times that the user j is reported and blocked by the other user in the media service, and the $n_{j,SNS}$ denotes the number of times that the user j is reported and blocked by the other user in the other service.

13. The method for providing a trust-based media service of claim 1, wherein the value indicating sincerity is calculated based on a standard deviation of a content which is produced by the user j in the media service and the other service.

14. The method for providing a trust-based media service of claim 13, wherein the value indicating sincerity is calculated based on a condition of $$\text{Sincerity }(j, t) = \frac{1}{STD^{j,A}} + \frac{1}{STD^{j,SNS}},$$

where the Sincerity (j, t) denotes the sincerity corresponding to consistency for an activity of the user j in the service, the $STD^{j,A}$ denotes a standard deviation of contents which are produced by the user j in the media service until a period t, and the $STD^{j,SNS}$ denotes a standard deviation of contents which are produced by the user j in the other service until the period t.

15. The method for providing a trust-based media service of claim 1, further comprising:
selectively putting a trustworthy tag to the content provided by the first user through each of the media service and the other service based on the trust information,
wherein the putting includes:
putting the trustworthy tag on the content of the first user when a value of the trust index corresponding to the trust information exceeds the predetermined threshold value; and
putting an untrustworthy tag on the content of the first user when the value of the trust index corresponding to the trust information is equal to or lower than the predetermined threshold value.

16. The method for providing a trust-based media service of claim 1, wherein the first user is a content producer and the second user is a content consumer or the first user is an analysis requestor who requests trust analysis and the second user is a respondent.

17. An apparatus for providing a trust-based media service, comprising:
a network interface device configured to collect first user related data and second user related data from a media service and another service through a network; and
a processor configured to analyze a trust based on the collected data forwarded from the network interface device, obtain trust information including a trust index of the first user or the second user, and control an access right to a content which is provided by the first user through each of the media service and the other service based on the trust information,
wherein during the controlling of the access right, when a value of the trust index corresponding to the trust information exceeds a predetermined threshold value, the access right is granted to the second user that receives the content, and when the value of the trust index corresponding to the trust information is equal to or lower than the predetermined threshold value, the access right is not granted to the second user,
wherein the trust index is calculated based on a value of trustworthiness for each of the first user and the second user that is obtained based on a first individual measurement index calculated based on the collected data and a value of a relationship between the first user and the second user obtained based on a second individual measurement index calculated based on the collected data,
wherein the first individual measurement index is calculated based on a value indicating ability for every user, a value indicating integrity for every user, a value indicating benevolence for every user, and a value indicating sincerity for every user, and
wherein the value indicating integrity for every user is based on a sum of the number of times that a user j is reported and blocked by another user in the media service and the number of times that the user j is reported and blocked by the other user in the other service.

18. The apparatus for providing a trust-based media service of claim 17, wherein the value indicating ability for every user is calculated based on the number of contents which are produced by the user in the media service and the other service, and the value indicating sincerity for every user is calculated based on a standard deviation of a content which is produced by the user in the media service and the other service, and the second individual measurement index is calculated based on a value indicating similarity of the first user and the second user calculated based on the number of contents which are sent from the first user to another user, the number of contents which are received from another user, the number of contents which are sent from the second user to another user, the number of contents which are received from another user; a value indicating a relationship period of the first user and the second user calculated based on a date when the first user starts using the service, a date when the second user starts using the service, a date when the first user and the second user become friends, and a first date when the second user sends the content to the first user; and a value indicating closeness of the first user and the second user calculated based on the number of contents which are sent by the second user to the first user, the number of likes expressed by the second user to the first user, the number of contents which are sent by the first user to the second user, the number of likes expressed by the first user to the second user.

19. The apparatus for providing a trust-based media service of claim 17, wherein the processor includes:

a trust-based content assistant configured to selectively put a tag representing a trustworthiness on a content provided by the first user through each of the media service and the other service based on the trust information, wherein when a value of the trust index corresponding to the trust information exceeds the predetermined threshold value, the trust-based content assistant puts a trustworthy tag on the content of the first user and when the value of the trust index corresponding to the trust information is equal to or lower than the predetermined threshold value, the trust-based content assistant puts an untrustworthy tag on the content of the first user.

\* \* \* \* \*